US009021696B2

(12) United States Patent
Jakimov et al.

(10) Patent No.: US 9,021,696 B2

(45) Date of Patent: May 5, 2015

(54) METHOD FOR PRODUCING A PLATING OF A VANE TIP AND CORRESPONDINGLY PRODUCED VANES AND GAS TURBINES

(75) Inventors: Andreas Jakimov, Munich (DE); Stefan Schneiderbanger, Bergkirchen (DE); Manuel Hertter, Munich (DE)

(73) Assignee: MTU Aero Engines AG, Munich (DE)

( * ) Notice: Subject to any disclaimer, the term of this patent is extended or adjusted under 35 U.S.C. 154(b) by 709 days.

(21) Appl. No.: 13/265,606

(22) PCT Filed: Apr. 21, 2010

(86) PCT No.: PCT/DE2010/000449

§ 371 (c)(1),
(2), (4) Date: Oct. 21, 2011

(87) PCT Pub. No.: WO2010/121597

PCT Pub. Date: Oct. 28, 2010

(65) Prior Publication Data

US 2012/0034092 A1 Feb. 9, 2012

(30) Foreign Application Priority Data

Apr. 23, 2009 (DE) ........................ 10 2009 018 685

(51) Int. Cl.

*B23P 6/00* (2006.01)
*F01D 5/28* (2006.01)
*C23C 4/08* (2006.01)
(Continued)

(52) U.S. Cl.

CPC . *F01D 5/288* (2013.01); *C23C 4/08* (2013.01); *C23C 4/18* (2013.01); *C23C 24/04* (2013.01); *F05D 2230/30* (2013.01); *F05D 2230/90* (2013.01)

(58) Field of Classification Search

USPC ............ 29/889.1, 402.11; 228/119, 175, 176
See application file for complete search history.

(56) References Cited

U.S. PATENT DOCUMENTS 3,199,836 A 8/1965 Moyer
4,227,703 A 10/1980 Stalker et al.
(Continued)

FOREIGN PATENT DOCUMENTS

DE 4310896 C1 3/1994
DE 20030170120 A1 9/2003
(Continued)

OTHER PUBLICATIONS

PCT: International Search Report and Written Opinion of PCT/DE2010/000449; Apr. 29, 2011; 20 pages (including English translation and translation certification).

(Continued)

*Primary Examiner* — Richard Chang
(74) *Attorney, Agent, or Firm* — Howison & Arnott LLP

(57) ABSTRACT

The invention relates to a method for producing a plating (5) of a vane tip. Said method consists of the following steps: a) a vane having a vane tip which is arranged opposite the base of the vane (2) and which comprises a surface which points radially outwards is provided, and b) a porous layer (7) is applied to at least the surface (4) of the vane tip and/or c) a bulge (8) which increases the surface of the vane tip is applied to at least one part of the flanks of the vane tip, said flanks surrounding the surface of the vane tip, and d) the plating (5) is applied to the porous layer and/or the bulge. The invention also relates to corresponding vanes or gas turbines with corresponding vanes.

16 Claims, 2 Drawing Sheets

(51) Int. Cl.
*C23C 4/18* (2006.01)
*C23C 24/04* (2006.01)

(56) References Cited

U.S. PATENT DOCUMENTS

| | | | | |
|---|---|---|---|---|
| 4,671,735 | A | 6/1987 | Rossmann et al. | |
| 5,156,321 | A * | 10/1992 | Liburdi et al. | 228/119 |
| 5,448,828 | A | 9/1995 | Willems et al. | |
| 6,194,086 | B1 | 2/2001 | Nenov et al. | |
| 8,597,724 | B2 * | 12/2013 | Bunting et al. | 427/142 |
| 2007/0190352 | A1 | 8/2007 | Bayer et al. | |
| 2007/0248750 | A1 | 10/2007 | Allen | |
| 2008/0000038 | A1 | 1/2008 | Koncherry | |
| 2009/0311552 | A1 | 12/2009 | Manier et al. | |

FOREIGN PATENT DOCUMENTS

| | | | |
|---|---|---|---|
| DE | 10343761 | A1 | 4/2005 |
| DE | 102005019905 | A1 | 11/2006 |
| DE | 102006016995 | A1 | 10/2007 |
| EP | 0273852 | A2 | 7/1988 |
| EP | 0661415 | A1 | 7/1995 |
| EP | 0919699 | A2 | 6/1999 |
| EP | 1336723 | A1 | 8/2003 |
| EP | 1365107 | A1 | 11/2003 |
| EP | 1674594 | A1 | 6/2006 |
| EP | 1820883 | A1 | 8/2007 |
| GB | 732325 | | 6/1955 |
| JP | 62113802 | A | 5/1987 |
| JP | 2003048106 | A | 2/2003 |
| JP | 2003-03-12 | A | 3/2003 |

OTHER PUBLICATIONS

German Patent and Trademark Office; German Search Report; Mar. 16, 2010; 8 pages (including English translation and translation certification).

* cited by examiner

METHOD FOR PRODUCING A PLATING OF A VANE TIP AND CORRESPONDINGLY PRODUCED VANES AND GAS TURBINES

CROSS-REFERENCE TO RELATED APPLICATIONS

This application is a U.S. National Phase application submitted under 35 U.S.C. §371 of Patent Cooperation Treaty application serial no. PCT/DE2010/000449, filed Apr. 21, 2010, and entitled METHOD FOR PRODUCING A PLATING OF A VANE TIP AND CORRESPONDINGLY PRODUCED VANES AND GAS TURBINES, which application claims priority to German patent application serial no. 10 2009 018 685.9, filed Apr. 23, 2009, and entitled VERFAHREN ZUR HERSTELLUNG EINER PANZERUNG EINER SCHAUFELSPITZE SOWIE ENTSPRECHEND HERGESTELLTE SCHAUFELN UND GASTURBINEN.

Patent Cooperation Treaty application serial no. PCT/DE2010/000449, published as WO 2010/121597, and German patent application serial no. 10 2009 018 685.9, are incorporated herein by reference.

FIELD OF THE INVENTION

The present invention relates to a method for producing a plating for a blade tip and correspondingly produced blades and gas turbines.

BACKGROUND AND PRIOR ART

The provision of platings on the blade tips of the blades of a gas turbine and in particular a jet turbine is known from the prior art. In particular, it is also known to introduce such platings by means of kinetic gas dynamic cold spraying, as illustrated by US 2007/0248750 A1 or US 2008/0038, for example. EP 1 674 594 A1 further illustrates a method for repairing blades with a corresponding method for gas dynamic cold spray.

However, as shown in FIGS. 1 and 3, various problems may arise therein. On one hand, the hard plating 5 may present with embrittlement cracks 6, which may migrate into the base material of the fan blade 3 and can thus lead to damage to the fan blade 3. Also, applying the plating 5 can result in a deviation from the planned geometry when there is a specific layering structure to the application of the plating, for example as in the pyramid-shaped layering structure illustrated in FIG. 3.

OBJECTIVE OF THE INVENTION

It is therefore the objective of the present invention to circumvent the disadvantages of the prior art described above, and in particular to provide a method for producing plating for a blade tip, in which the problem of embrittlement cracks migrating into the base work material originating from the plating and shape deviations due to the plating deviating from the prescribed shape of the blade tip is to be avoided. However, the method must be easily practicable and yield reliable results—that is, the blades must retain the required set of properties. Correspondingly, such blades and gas turbines are also to be provided.

SUMMARY AND TECHNICAL SOLUTION

This objective is addressed by a method with the features disclosed and claimed herein, blades with the features disclosed and claimed herein, and a gas turbine with the features disclosed and claimed herein. The dependent claims deal with advantageous embodiments.

According to the present invention, in a method for producing a plating for a blade tip, a porous layer and/or at least a part of a bulge which increases the deposition surface of the plating is provided underneath the plating. By means of the porous layer that is arranged underneath the plating, it is possible to prevent cracks from extending from the plating into the base material of the fan blade. By the additional step of providing a bulge encircling the coating surface of the blade tip in order to increase the coating surface, which may be carried out either in alternation with or combination with arranging the porous layer underneath the plating, it is possible to establish the desired shape of the blade tip even with a layer that grows in a prescribed shape such as a pyramid shape. For this reason, namely, the bulge may be later removed with the excess plating deposited thereon after the coating—that is, after the plating has been applied—according to the shape, which should occupy the blade tip.

Such a procedure is particularly advantageous for blades with a relatively "soft" base material, for which plating is necessary. Correspondingly, the present invention can especially be applied to blades that are made from a titanium-based alloy, a nickel-based alloy, an aluminum-based alloy or a magnesium-based alloy, or that comprise such alloys in at least the region of the blade tip. For such blades, platings can be provided on the blade tip made of a nickel-based alloy or an iron-based alloy. The plating may include, in particular, nitrides, carbides, and/or oxides as hard material particles or abrasive particles. In particular, the plating may be made from an MCrAlY alloy, where M stands for nickel, cobalt or iron.

In the framework of the present description and claims, the term "blade," refers to any blade of a gas turbine, independent of where on the gas turbine the same is located. In particular, the term "blade" is understood to be blades in the field of compressors for gas turbines (compressor blades) as well as in the actual field of turbines (turbine blades).

By the term "base alloy," it is understood in the framework of this application that the corresponding alloy includes the metal named in the name of the base alloy as the primary component—that is, as the component with the largest proportion in the composition, or as the predominant component; i.e., having a proportion greater than one half of the composition. However, in the present case, the term "base alloy" is not understood to be only an alloy with many constituents, in particular with constituents for forming hardening particles, but rather it can be a simple alloy with only two or three constituents to a nearly pure material of the eponymous metal, which contains only trace alloy elements and/or unavoidable impurities.

The porous layer and/or the bulge can be generated by any appropriate method of application, wherein in particular spraying and preferably thermal spraying may be used.

The porous layer and/or the bulge may be made from a single material, which is adapted with regards to the properties thereof to either the base material of the fan blade and/or the material of the plating. Correspondingly, the porous layer and/or the bulge can in particular be made form a material that primarily contains the elements from which the base material and/or the plating are made. The porous layer and/or the bulge can thereby be a titanium-based alloy, a nickel-based alloy, an aluminum-based alloy or an iron-based alloy. Here the same definition applies with regard to the base alloys as given above.

The plating is preferably applied by means of a kinetic gas dynamic cold spray or also a kinetic cold gas compaction (called "K3"). In this method, the particles of the coating material are accelerated to a high velocity onto the surface to be coated, wherein the temperatures are selected such that the coating material does not melt, but rather possesses only a certain amount of ductility which, during the impact of the particles, leads to the same deforming and flowing into one another, so as to generate a deep coupling of the particles that results in a favorable bond strength of the coating onto the material to be coated. The kinetic gas dynamic cold spray can be performed at a temperature of 300° C. to 900° C., in particular 400° C. to 750° C., or a pressure of 20 bar to 50 bar, in particular 30 bar to 40 bar, and/or a particle velocity of 500 m/s to 1,200 m/s, in particular 700 m/s to 1,000 m/s. The size of the particles may fall within the range of 5 μm to 100 μm, in particular 10 μm to 50 μm.

The bulge and/or at least a part of the plating can be removed by any appropriate method, in particular by a mechanical and/or chemical processing.

In particular, a cutting method like milling or a wet chemical method like etching can be used herein.

After the blade tip has been processed—that is, after the removal of the bulge and the excess plating material, the plating possesses corresponding mechanically and/or chemically processed lateral surface that form a linear extension of the blade surface in the radial direction, meaning the direction starting from the blade base out to the blade tip, such that the plating and a porous layer potentially arranged therebeneath occupy the desired contour of the blade tip.

BRIEF DESCRIPTION OF THE FIGURES

Further advantages, characteristics and features of the present invention are made clear by the following detailed description of the embodiments. The figures illustrate the following in a purely schematic manner.

DETAILED DESCRIPTION AND EMBODIMENTS

Figure 1:
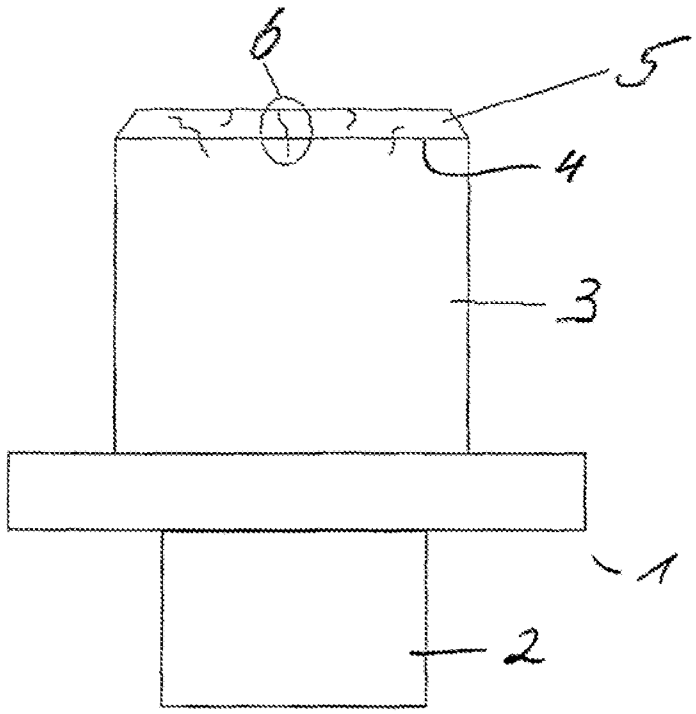
Fig. 1 (Prior Art)
FIG. 1 illustrates a side view of a known (i.e., prior art) blade with plating.

FIG. 1 illustrates a known blade according to the prior art, comprising a blade base 2 and a fan blade 3. A surface 4 pointing radially outward, on which the plating 5 is arranged, is provided on the blade tip.

Cracks 6, which may extend into the base material of the fan blade 3, may occur in the plating 5. The fan blade 3 may thereby be damaged.

Figure 2:
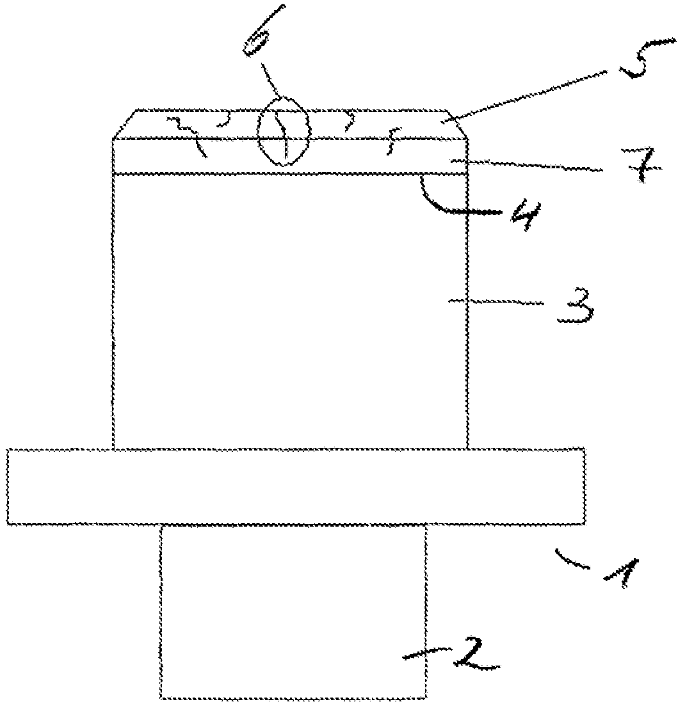
FIG. 2 illustrates a side view of a blade according to the present invention.

In an embodiment according to the present invention, as illustrated in FIG. 2, the blade 1 comprises between the base material of the fan blade 3 under the plating 5 an additional layer 7 that has been formed as a porous layer. The pores in the porous layer 7 act as a stop for the crack growth against damage from cracks, such that the cracks 6 are prevented from being able to expand into the base material of the fan blade 3. The construction of the blade 1 is otherwise identical to the one illustrated in FIG. 1, such that the same reference numerals are used and an additional description of the components provided with the same reference numerals is unnecessary. The same is true of the following representations of FIG. 3 and FIG. 4.

Figure 3:
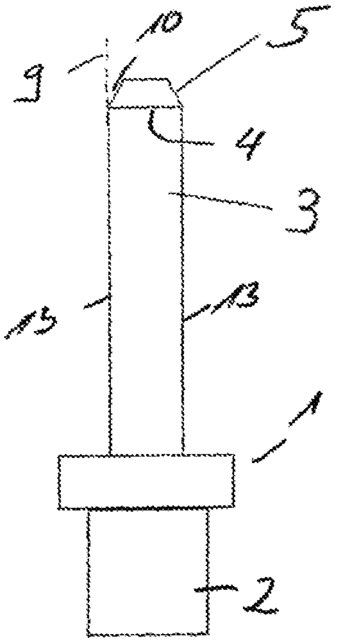
Fig. 3 (Prior Art)
FIG. 3 illustrates a side view of a known (i.e., prior art) blade.

Again, FIG. 3 illustrates a side view of a blade 1, similar to the representation in FIG. 1 and FIG. 2. The blade 1 as represented in FIG. 3 shows a further problem in the prior art. The plating 5, arranged on the surface 4 of the blade tip, as a pyramid-shaped construction, such that the cross-section of the plating is smatter on the radial outward side than the cross-section of the surface 4 of the blade tip. This is evident when the lateral surface of the fan blade 3 extends linearly in the radial direction, as illustrated by the dashed line 9. Herein it is illustrated that between the linear, radial extension of the sides 13 of the fan blade and the plating 5 there exists a space 10, in which no plating is present, such that the geometry of the blade tip is altered by the plating 5.

Figure 4:
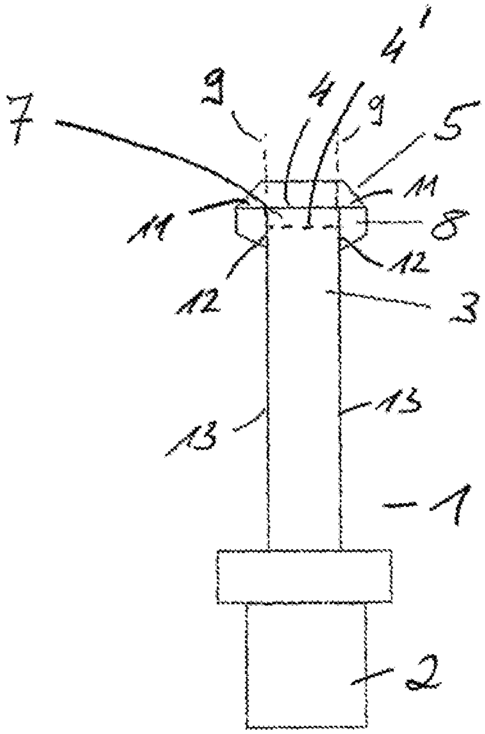
FIG. 4 illustrates a side view of a blade according to the present invention in the process of being produced.

In order to prevent this, according to the embodiment of FIG. 4, an encircling bulge 8 is provided on the flanks 12 of the blade tip—that is, on the lateral surfaces 13 of the blade tip in the region of the blade tip, which broadens the radial surface area of the blade tip. The plating 5 is thereby deposited on the surface 4 of the blade tip that points radially outward as well as on the corresponding surface of the bulge 8, such that despite the pyramid layering structure, a blade tip geometry can be produced that corresponds to the desired shape. Hereby, the bulge 8 is later removed along with the protruding region of the plating 11 after the plating has been applied, so as to yield a lateral surface of the fan blade 3 and the plating 5 that is given corresponding to the dashed line 9 of the linear and radial extension of the lateral surface 13 of the fan blade 3. The removal of the bulge 8 and the region 11 of the plating 5 can be achieved by any appropriate method, such as a mechanical removal method like cutting methods like lathing, milling and the like, or by a chemical processing like wet chemical etching and the like.

The embodiments as illustrated in FIG. 2 and FIG. 4 can be combined with one another so as to provide an additional porous layer 7 between the plating 5 and the base material of the fan blade 3. This can be applied as a part of the bulge 8 or in connection to the bulge 8 on the blade tip. This is illustrated by the dashed line in the region of the blade tip in FIG. 4. The dashed-line surface 4' of the blade tip illustrates the state of when another porous layer 7 is arranged on the blade tip beneath the plating 5, while the solid-line surface 4 of the blade tip indicates the state of when no additional porous layer 7 is provided.

For the case in which a porous layer 7 is provided, the porous layer 7 can be applied prior to the attachment of the bulge 8 or applied together with the bulge on the blade tip. Correspondingly, the bulge and the porous layer 7 can contain different materials independent of one another or can be made from the same material and can be produced in a joint operation.

Figure 5:
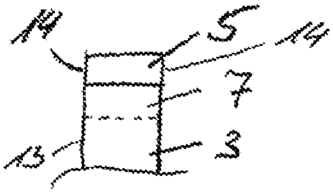
FIG. 5 illustrates a detailed view of the finished blade tip from FIG. 4.

FIG. 5 illustrates a partial view of a completed processed blade tip of the blade 1 from FIG. 4. Here it can be seen that the lateral surfaces 14 of the plating after mechanical and/or chemical processing are arranged in linear extension in the radial direction to the linear surfaces 13 of the fan blade 3, and that these lateral surface 13, 14 come into alignment. The contour of the blade tip, which is in a rectangular shape in the shown illustration, remains preserved by the plating 5. Especially when repairing blades with a method according to the present invention or of the arrangement of the corresponding layers, it is thereby possible to ensure a restoration of the desired shape of the blade tips.

In the illustrated embodiment, the porous layer 7 or the bulge 8 is applied by spraying, in particular thermal spraying, wherein yet another appropriate application method may be used. The plating is initiated by means of kinetic cold gas compaction or gas dynamic cold spray, which produces particularly favorable properties for the plating. The kinetic cold gas compaction or kinetic gas dynamic cold spray is performed at temperatures in the range of 300° C. to 800° C. and a gas pressure of 30 bar to 40 bar, such that the particle velocity is in the range of 500 m/s to 1,000 m/s. The particle size thereby moves within the range of 5 μm to 50 μm. Impacting the particles at a high velocity and at a relatively low temperature leads to a plastic deformation of the material and a solid, compacted arrangement of the plating. Herein the plating may be made in particular from a nickel-based material or an iron-based material containing nitrides, carbides and oxides as hard material particles. For example, a material with the composition MCrAlY, where M=nickel or iron, can be used for the plating.

For the porous interlayer, according to the selection of the base material of the fan blade 3, corresponding materials can be selected that are either similar to the composition of the plating or to the composition of the base material. When an aluminum-based, magnesium-based or titanium-based alloy is used for the base material of the fan blade 3, it is in particular possible to use nickel-, iron-, titanium-, magnesium-, or aluminum-based alloys for the porous layer. In particular, the structure of the presented blade, or the corresponding method for producing or repairing a corresponding fan blade for blades made from titanium-based alloys and a nickel plating have been successfully tested, wherein a titanium- or nickel-based alloy was used as the porous interlayer or as the bulge.

Although a detailed description has been provided for the present invention by means of the included embodiment, it is self-evident to the person having ordinary skill in the art that the present invention is not limited to these embodiments, but rather it is possible to make various modifications, such as by omitting individual features or by a different combination of individual features, without departing from the scope of protection of the attached claims. In particular, the present invention comprises all combinations of all presented features.

What is claimed is:

1. A method for producing a plating for a blade tip, the method comprising the following steps:

a) providing a blade having an original configuration with an original radially outward facing surface defining the blade tip, the blade tip being arranged radially outward opposite a blade base;

b) applying a porous layer radially outward over at least the blade tip;

c) applying a bulge to at least one lateral side of the original configuration of the blade to produce a new configuration of the blade with a radially outward facing surface of the bulge defining a supplemental radially outward facing surface laterally adjacent to the blade tip;

d) applying the plating over at least a radially outward face of the porous layer radially outward from the blade tip and over at least a portion of the supplemental radially outward facing surface laterally adjacent to the blade tip; and e) removing the bulge after applying the plating such that the supplemental radially outward facing surface of the bulge and any of the porous layer or the plating disposed radially outward from the supplemental radially outward facing surface are removed and the blade tip is covered in the radially outward facing direction by the porous layer having a uniform thickness in the radial direction and the porous layer is covered in the radially outward facing direction by the plating having a uniform thickness in the radial direction.

2. A method in accordance with claim 1, wherein the step of applying the porous layer occurs before the step of applying the bulge.

3. A method in accordance with claim 1, wherein the step of applying the porous layer occurs simultaneously with the step of applying the bulge.

4. A method in accordance with claim 3, wherein the porous layer and the bulge are produced from the same material.

5. A method in accordance with claim 1, wherein:

at least one of the blade and the blade tip is made of one of a titanium-based alloy, a nickel-based alloy, an aluminum-based alloy and a magnesium-based alloy; and the plating is made with one of a nickel-based alloy and an iron-based alloy.

6. A method in accordance with claim 1, wherein at least one of the porous layer and the bulge are sprayed on.

7. A method in accordance with claim 1, wherein at least one of the porous layer and the bulge are made with one of a titanium-based alloy, a nickel-based alloy, an aluminum-based alloy, a magnesium-based alloy and an iron-based alloy.

8. A method in accordance with claim 1 wherein the plating is applied using a kinetic gas dynamic cold spray or compaction (K3).

9. A method in accordance with claim 8, wherein the kinetic gas dynamic cold spray or compaction is applied under at least one of the following conditions:

a temperature within the range from 300 ° C. to 900 ° C.;

a pressure within the range from 20 bar to 50 bar;

a particle velocity within the range from 500 m/s to 1,200 m/s; and a particle size of the plating material for the kinetic gas dynamic cold spray or compaction within the range from 5 μm to 100 μm.

10. A method for producing a plating for a blade tip, the method comprising the following steps:

a) providing a blade including a blade base and a fan blade attached to the blade base, the fan blade being made of a base material and having lateral surfaces extending radially outward from the blade base, the radially outward facing surface of the fan blade disposed within a linear and radial extension of the lateral surfaces of the fan blade defining the blade tip;

b) applying a porous layer radially outward over at least the blade tip;

c) applying a bulge to at least one lateral surface of the fan blade laterally proximate to the blade tip to produce a radially outward facing surface of the bulge defining a supplemental radially outward facing surface laterally adjacent to the blade tip;

d) applying the plating having a pyramid-shaped construction over at least a radially outward face of the porous layer radially outward from the blade tip and over at least a portion of the supplemental radially outward facing surface laterally adjacent to the blade tip; and e) removing the pyramid-shaped construction of the plating by removing the bulge after applying the plating such that the supplemental radially outward facing surface of the bulge and any of the porous layer or the plating disposed radially outward from the supplemental radially outward facing surface of the bulge are removed and the blade tip is covered in the radially outward facing direction by the porous layer having a uniform thickness in the radial direction and the porous layer is covered in the radially outward facing direction by the plating having a uniform thickness in the radial direction.

11. A method in accordance with claim 10, wherein the step of applying the plating having a pyramid-shaped construction continues until the plating has a uniform thickness in the radial direction radially outward from the blade tip within the linear and radial extension of the lateral surfaces of the fan blade defining the blade tip.

12. A method in accordance with claim 10, wherein the step of applying the porous layer occurs before the step of applying the bulge.

13. A method in accordance with claim 10, wherein the step of applying the porous layer occurs simultaneously with the step of applying the bulge.

14. A method in accordance with claim 13, wherein the porous layer and the bulge are produced from the same material.

15. A method in accordance with claim 10, wherein at least one of the porous layer and the bulge are sprayed on.

16. A method in accordance with claim 10 wherein the plating is applied using a kinetic gas dynamic cold spray or compaction (K3).

* * * * *